United States Patent
Mena et al.

(10) Patent No.: US 9,147,013 B2
(45) Date of Patent: Sep. 29, 2015

(54) WIRELESS SENSOR WITH FRAM

(75) Inventors: Rafael A. Mena, McKinney, TX (US); Arun Vellore Chandramouli Kumar, Garland, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 406 days.

(21) Appl. No.: 13/602,155

(22) Filed: Sep. 1, 2012

(65) Prior Publication Data

US 2014/0062669 A1    Mar. 6, 2014

(51) Int. Cl.
*G06F 17/40* (2006.01)
*H04W 52/02* (2009.01)

(52) U.S. Cl.
CPC ........... *G06F 17/40* (2013.01); *H04W 52/0216* (2013.01); *H04W 52/0219* (2013.01); *Y02B 60/50* (2013.01)

(58) Field of Classification Search
CPC . G06F 17/40; H04W 52/0219; H04W 52/216
See application file for complete search history.

(56) References Cited

U.S. PATENT DOCUMENTS

| 2006/0094380 | A1  | 5/2006 | Slatter |   |
|---|---|---|---|---|
| 2008/0211638 | A1  | 9/2008 | Masui et al. |   |
| 2011/0158806 | A1* | 6/2011 | Arms et al. | 416/31 |

OTHER PUBLICATIONS

Peter Desnoyers et al, "PRESTO: A Predictive Storage Architecture for Sensor Networks", HOTOS'05 Proceedings of the 10th conference on Hot Topics in Operating Systems, vol. 10, Jun. 12-15, 2005, Santa Fe, NM, pp. 1-6.

"FRAM embedded RFID LSI MB97R803A/B, MB97R804A/B" Fujitsu Semiconductor Fact Sheet, NPs411-00001-0v01-E, Fujitsu Semiconductor Limited, Jun. 2011, pp. 1-4.

"Part 15.4: Low-Rate Wireless Personal Area Networks (LR-WPANs), Amendement 1: MAC sublayer", IEEE Standard for Local and metropolitan area networks, New York, NY, Apr. 16, 2012, pp. 1-225.

Sandeep Bhadra et al, "Demo: Achieving a 10x Lifetime increase with IEEE 802.15.4e Motes", SenSys'11 Proceedings of the 9th ACM Conference on Embedded Networked Sensor Systems, Nov. 1-4, 2011, Seattle, WA, pp. 375-376.

"FRAM embedded RFID LSI for 13.56MHz MB89R118C", Fujitsu, 2010, Find vol. 28, No. 4, pp. 1-5.

John Heidemann et al, "Building Efficient Wireless Sensor Networks with Low-Level Naming", SOSP '01 Proceedings of the eighteenth ACM symposium on Operating systems principles, New York, NY, Oct. 21-24, 2001, Banff, Canada, pp. 1-14.

* cited by examiner

*Primary Examiner* — Brian Zimmerman
*Assistant Examiner* — Sara Samson
(74) *Attorney, Agent, or Firm* — John R. Pessetto; Charles A. Brill; Frank D. Cimino (57) ABSTRACT

A wireless sensor module for use in a wireless sensor network. The sensor module collects sensor data in a periodic manner with a first time period. The sensor data is logged in a non-volatile ferroelectric random access memory (FRAM) within the sensor module. The sensor module is placed in a reduced power idle mode between sensor data collection periods, wherein the logged sensor data is preserved by the FRAM during the idle mode. A representation of the logged sensor data is transmitted over a radio channel to a remote receiver in a periodic manner with a second time period, wherein the second time period is longer than the first time period.

7 Claims, 4 Drawing Sheets

FIG. 6 ously complicating the description.

WIRELESS SENSOR WITH FRAM

FIELD OF THE INVENTION

This invention generally relates to use ferroelectric random access memory (FRAM) in a wireless sensor module, and more particularly to using the FRAM to log data collected by the sensor module.

BACKGROUND OF THE INVENTION

Remote wireless sensor networks may include sensor nodes spread out over a home, office building, or factory to help with energy management, comfort enhancement, security, diagnostics, and other applications. Battery life is a key consideration when implementing a wireless sensor network as many battery-operated sensors may be in inaccessible locations. Additionally, changing batteries in a large number of sensor nodes poses huge operational and environmental costs. Radio power of these wireless nodes is a major cause of battery drain. RF standards such as ZigBee are popular in low data rate, low power applications. ZigBee and other low power RF standards use MAC and PHY layers defined by IEEE 802.15.4. An amendment to 802.15.4, called 802.15.4e uses a duty-cycled MAC (media access control) to reduce radio power consumption. Even if the radio is duty-cycled, it still consumes a majority of the current in the application. In a wireless sensor network, one of the driving parameters in the determination of battery lifetimes is the overall energy consumption during RF transmission. Transmitting large amounts of sensor collected data drives higher RF duty cycles, increasing the energy consumption of the system and reducing the overall battery lifetime of the wireless sensor network.

BRIEF DESCRIPTION OF THE DRAWINGS

Particular embodiments in accordance with the invention will now be described, by way of example only, and with reference to the accompanying drawings.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Remote wireless sensor networks may include sensor nodes spread out over a home, office building, or factory to help with energy management, comfort enhancement, security, diagnostics, and other applications.

Ferroelectric random access memory (FRAM) is a non-volatile memory technology with similar behavior to DRAM (dynamic random access memory). Each individual bit can be accessed, but unlike EEPROM (electrically erasable programmable read only memory) or Flash, FRAM does not require a special sequence to write data nor does it require a charge pump to achieve required higher programming voltages. Embodiments of the invention may utilize FRAM technology to reduce energy costs associated with data logging within a sensor node in a wireless network. FRAM technology enables the use of in-network local storage within each remote sensor node to reduce the overall communication requirements. In this case, the power consumption of end node in-network local storage with the use of FRAM is significantly lower compared to the energy needs associated with the RF (radio frequency) communications. The amount of data to be transmitted and the RF duty cycle drives the battery lifetime of the system.

An overall reduction in communication energy cost may be achieved by enabling the sensor to carry out adaptive changes to its data collection based on the historical data collected over time. The sensor may chose to disregard data if it does not detect any significant changes based on the trends observed over a predefined sampling period. The sensor can build predictive time series models taking advantage of the low computational energy requirements associated with the algorithm due to the lower power requirements of FRAM. These time-series models require a significant amount of historical data to build the required accuracy and can only be achieved with a low energy consumption memory technology such as FRAM to take advantage of the local storage. A significant reduction in energy cost may be realized from a reduction of the amount of data that is transferred over RF.

The lower energy costs associated with FRAM may also allow for aggregation of the sensor-collected data that rely on hash tables to perform duplicate packet suppression. These hash tables are typically too large to be carried out in RAM which has comparable energy consumption requirements. FRAM-based data management schemes can be used to store these hash tables with low energy costs, thereby improving the performance of the sensor node.

Figure 1:
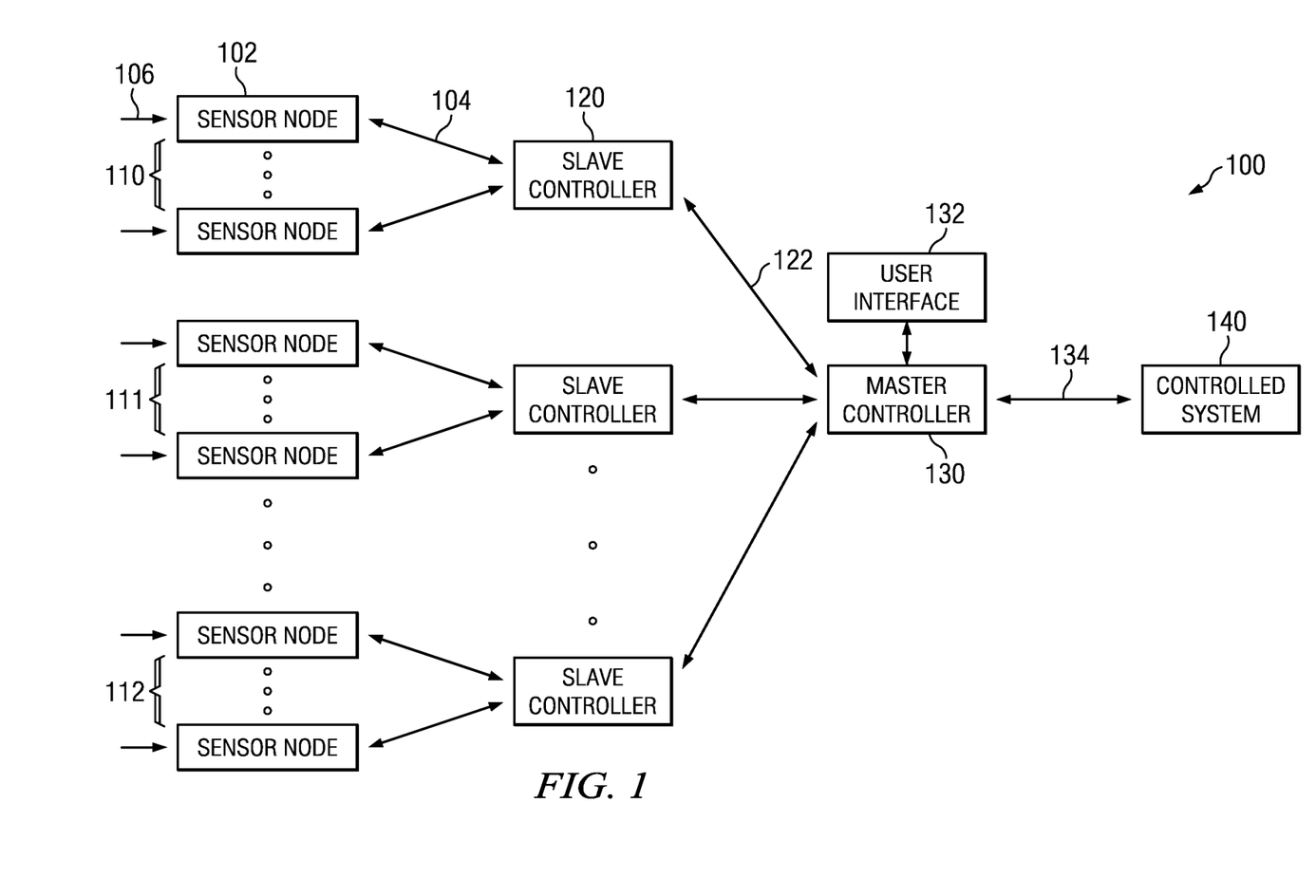
FIG. 1 is an illustration of a wireless sensor network (WSN)

FIG. 1 is an illustration of a wireless sensor network 100 that includes a number of wireless sensors 102. Each sensor 102 may be configured to monitor one or more environmental parameters 106 within or around a residence or commercial building, for example. Depending on the capability of the sensor, various types of parameters may be monitored, such as: temperature, pressure in pipes or ducts, flow rate in pipes or ducts, barometric pressure in a room, vibration or other seismic motion, motion within a room or other region, light level, humidity, etc. Each sensor 102 is equipped with a wireless transmitter that enables it to transmit collected environmental data to a higher level controller in the hierarchy of network 100 over a wireless link 104. Typically, each sensor may also receive commands or instructions over wireless link 104 from the higher level controller.

Sensors 102 may be organized into groups such as illustrative groups 110-112. More or fewer sensors 102 may be organized into more or few groups than illustrated here. Grouping may be based on various factors, such as: physical location within a building, type of data being collected by the sensor, etc. Each sensor in a group, such as group 110, may wirelessly transmit collected environmental data to a higher level controller assigned to that group, such as controller 120, using a wireless signal as indicated at 104. In this example, controllers 120 act as slave controllers that are each configured to relay all collected environments data to a master controller 130 using a wireless or wired communication channel as indicated at 122. Master controller 130 may be coupled to a user interface 132. User interface 132 may be a screen or other display device coupled to a computer system, for example. The data collected from sensors 102 by master controller 130 may then be displayed in a human readable form on user interface 132, for example. Master controller 130 may be coupled 134 to a resource system 140 that is being controlled in response to sensor network 100. Coupling 134 may be a hardwire interconnect, a wireless interconnect, or any other type of coupling now known or later developed. Master controller 130 may send control commands via coupling 134 to resource system 140 to cause system 140 to change an operating parameter or some other aspect of system 140.

For example, resource system 140 may be the heating, ventilation, and air conditioning (HVAC) system for a residence or commercial building. In response to temperature information gathered by sensors 102, various dampers may be adjusted and cooling or heating operation of system 140 may be increased or decreased in order to maintain optimum temperature in each room of the building. In another example, resource system 140 may be a lighting system for a residence or commercial building. In response to outside light levels, interior light levels, and presence or absence of people in a room as detected by sensors 102, lighting to each room may be adjusted.

Master controller 130 may also send command information to slave controllers 120 and thereby to some or all of sensors 102 via wireless transactions. For example, commands may be sent to change a data sampling rate, activate, or deactivate various sensor elements within a sensor node, etc.

Depending on the size and physical extent of network 100, there may be fewer or additional levels of control hierarchy exemplified by slave controllers 120 in a given embodiment of network 100. The overall operation of distributed sensor networks is well known and will not be described in further detail herein.

Figure 2:
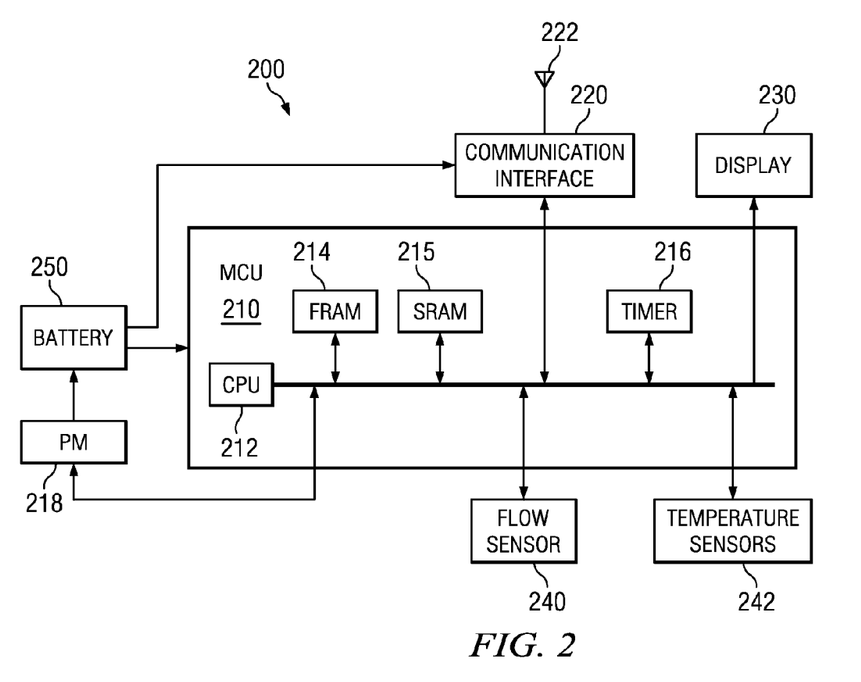
FIG. 2 is a block diagram of a wireless sensor for use in the network of FIG. 1.

FIG. 2 is a block diagram of a wireless sensor 200 for use in network 100 of FIG. 1. Wireless sensor 200 may be used for some or all of sensor nodes 102, for example. Sensor node 200 includes a microcontroller (MCU) 210 coupled to a communications interface 220. MCU 210 may include an FRAM storage module 214, a static random access memory 215, one or more timer modules 216, and other various interfaces for coupling to communications interface 220, display 230, and sensors 240, 242.

MCU 210 may be embodied as an MSP430FR57xx available from Texas Instruments, for example. The Texas Instruments MSP430FR57xx family of ultralow-power microcontrollers includes multiple devices featuring embedded FRAM nonvolatile memory, ultralow power 16-bit MSP430 CPU, and different peripherals targeted for various applications. The architecture, FRAM, and peripherals, combined with seven low-power modes, are optimized to achieve extended battery life in portable and wireless sensing applications. FRAM is a nonvolatile memory that combines the speed, flexibility, and endurance of SRAM with the non volatility of flash, all at lower total power consumption. Peripheralsmay include 10-bit ND converter, 16-channel comparator with voltage reference generation and hysteresis capabilities, three enhanced serial channels capable of I$_2$C, SPI, or UART protocols, internal DMA, hardware multiplier, real-time clock, five 16-bit timers, and more.

Ferroelectric random access memory (FRAM) is a non-volatile memory technology with similar behavior to DRAM. Each individual bit can be accessed and unlike EEPROM or Flash, FRAM does not require a special sequence to write data nor does it require a charge pump to achieve the higher programming voltages. FRAM programs at 1.5V versus the 10-14V of Flash or EEPROM. While Flash programming occurs through a tunneling mechanism, FRAM programming relies on a ferroelectric effect to induce polarization in a dipolar molecule. The ferroelectric effect occurs due to the electrical dipole formed by Zirconium (Zr) and Oxygen (O) atoms in the ceramic Lead-Zirkonate-Titanate crystal (PZT) of the FRAM cell. The electric field causes a polarization hysteresis effect as it moves the Zi-atom within the PZT crystal with increasing field strength. The hysteresis occurs as a result of the interaction of this Zi-atom with the O-atoms. The Zi-atom is moved from one direction or the other by the polarity of the electric field. Unlike a magnetic hysteresis effect, the polarization hysteresis of the PZT molecule is not influenced by external magnetic fields. The Zi-atom atom will remain in place unless an electric field is applied and provides for non-volatility of the memory when power has been removed. This means that it wears down far less if at all for each memory operation, and consequently lasts over 1 billion times longer than Flash. Finally, since FRAM is not written through a tunneling mechanism, it is up to 1000× more resistant to radiation such as gamma rays than Flash/EEPROM.

In addition, FRAM does not need a pre-erase cycle and the molecule polarizes in 1 or 2 nanoseconds, so the write operation is about 1000× faster than the previously mentioned nonvolatile counterparts. Because the speed of FRAM is equivalent to embedded Static RAM in many microcontrollers in addition to its dynamic accessibility and non-volatility, it is what is commonly referred to as a Universal Memory. This means it can function as the data memory or the program memory at any given time in its life. This gives designers the freedom to create embedded software that may rely heavily on data processing, depending on their specific needs, without worrying about the limitations of the microcontroller. No other embedded memory can claim this feature.

In this example, FRAM 214 provides 16 kB of storage, SRAM 215 provides 1 KB of storage, CPU 212 is a 16-Bit RISC Architecture that operates at speeds up to 8-MHz. However, other embodiments may include other types of CPU and different memory capacities. Since the FRAM is non-volatile, an application program may be stored within FRAM 214 for execution by CPU 212. A portion of FRAM 214 may also be allocated for use as a data memory to store data that is collected from sensors 240, 242. Since FRAM does not have the write restrictions associated with Flash non-volatile memory, FRAM 214 may be used as a scratch pad memory during processing of the collected sensor data, as will be described in more detail below.

Communications interface 220 may include a transmitter and a receiver for wireless communication with an external controller, such as controller 120 of FIG. 1. Interface 220 may communicate using RF standards such as ZigBee, which is popular in low data rate, low power applications. ZigBee and other low power RF standards use MAC and PHY layers defined by IEEE 802.15.4. An amendment to 802.15.4, called 802.15.4e uses a duty-cycled MAC to reduce radio power consumption. Interface 220 may be embodied as a CC3000-TiWI-SL module, available from Texas Instruments, for example.

Display 230 may be a simple set of LEDs (light emitting diodes), or a more complex LCD (liquid crystal display), for example. In some embodiments, display 230 may be omitted.

This example includes a flow sensor 240 for sensing water flow rates and two temperature sensors 242 for sensing air temperature. However, various embodiments may include a wide range of known or later developed sensors that may be used to collect various types of environmental data. This example of MCU 210 includes a 200-ksps 10-bit ADC and 2 op-amps that may be used to gather and process environmental data from sensor 240, 242.

Battery 250 provides power to MCU 210, communication interface 220, display 230 and sensors 240, 242. Power management (PM) logic 218 may be included within MCU 210, or it may be separate. PM logic 218 may be configured to control power levels provided to MCU 210, communications interface 220, display 230, and sensors 240, 242. Various schemes for controlling and changing power consumption by various domains within an integrated circuit and multichip system that are now known or later developed may be used by PM 218. For example, this may include raising or lowering voltage levels provided by battery 250 to the various components. This may also include changing a clock rate provided to MCU 210, for example.

Power management logic 218 may be configured under control of a software program being executed by CPU 218 to control the supply of power to each of the modules within sensor node 200. The use of PM logic 218 to reduce power consumption and extend the life of battery 250 will be described in more detail below.

An ever increasing need in remote wireless sensor networks (WSN), such as WSN 100, is the ability to maximize the system power efficiency of end nodes where large amounts of data are extracted and battery lifetimes need to be maximized. As will now be described in more detail, use of non-volatile ferroelectric RAM memory (FRAM) technology within a sensor node such as sensor node 200 may significantly reduce active currents within the sensor node by up to 50 percent and improve write times by orders of magnitude compared to Flash memory technologies. This allows extended data logging and data processing possible even in highly power constrained systems. FRAM can also enable dramatic reduction in radio duty cycle for some applications. The calculated energy consumption per processed byte scales accordingly. This translates to a significant improvement in both the overall system power and processing efficiencies of the WSN, enabling extended battery life and application scenarios not possible with Flash-based systems.

Comparison of FRAM Based Sensor Node and Flash Based Sensor Node

A comparison between the power efficiency of a FRAM-based wireless sensor networks versus a Flash-based solution will now be described. An energy consumption model is derived for both a FRAM and Flash-based wireless sensor network using a subsystem energy consumption model. The model accounts for the major components of the embedded wireless solution, including the processor, non-volatile memory, wireless radio, and various sensors. Packet frame requirements of an IEEE 802.15.4 PHY and MAC wireless communication protocol including consideration of anti-collision are accounted for. In this case, transmit and receive power consumption are accounted for in the appropriate acknowledge response. The impact of memory write cycles and RF duty cycle is considered for an example heat allocator application on both systems. A dominant parameter is defined based on the RF duty cycle. Overall energy efficiency is determined a comparison is made for various use cases on the battery lifetime of the WSN.

A typical analysis of wireless sensor networks (WSN) tends to focus primarily on the energy consumption of the RF communication channel, disregarding the contributions of the microcontroller (MCU) and associated peripherals in the energy consumption profile. Furthermore, a typical analysis also fails to account for data logging requirements associated with many of these sensor-based wireless solutions. While this is certainly applicable for WSNs running at higher RF duty cycles where the energy consumption of the RF interface is several orders of magnitude higher compared to the other components in the system, for lower RF duty cycle systems, this assumption starts to break down. By limiting the packet data transmission events and reducing the active listening cycle of the RF protocol, active RF duty cycles of less than 0.5 percent can be readily achieved [1]. In this case, the energy consumption breakdown is driven partially by all of the components in the system. In order to extend the battery lifetime of the system, each of these components needs to be understood and optimized for the specific use conditions. For a WSN intended to monitor and collect sensor data, the storage of this data and subsequent RF transmission needs to be accounted for at the system level.

A question arises as to whether network storage of the sensor data at the end node is more efficient than network storage at a higher level in the network hierarchy. At the sensor level, there is a need to account for not only the energy required to carry out the storage but the subsequent energy required to transmit the data to the local gateway, such as slave controller 120 in WSN 100, referring again to FIG. 1. The gateway collects the data from the different sensor end nodes and ensures that it is deposited in a central database coupled to master controller 130 in WSN 100. End node network storage within each sensor node enables a reduction in the communication energy consumption by amortizing the RF energy requirements over a larger number of bytes, but at the expense of higher memory energy consumption costs. Accounting for the low RF duty cycle, this tradeoff is achieved only when the memory energy consumption is minimal relative to the other parameters. FRAM technology drives this rethinking of wireless sensor network design by exploiting the high capacity and highly energy efficient storage capabilities provided by FRAM technology. This memory technology allows for a larger amount of sensor data to be stored locally prior to transmission to the gateway. By taking advantage of the aggregation of this larger amount of data, the overall system energy efficiency is additionally optimized.

In this example, the benefit of FRAM technology over other memory technologies is illustrated using the example of a 'heat allocator' wireless sensor network. A heat allocator is a device that measures the energy usage of individual radiators inside a building. A systems analysis is carried out for this application and a subsystems consumption energy efficiency model is derived accounting for all of the major components of the system. Using this subsystems energy consumption model, a system comparison of FRAM versus Flash based systems is performed. For this system example, the end node energy usage is considered and not the gateway as it is assumed that the gateway 120 is typically line-powered.

Heat Allocator WSN example

A heat allocator sensor is a device that measures the total heat output of an individual water heat radiator. The heat allocator sensor node is attached directly to the radiator itself.

A block diagram of a typical heat allocator sensor node 200 is shown in FIG. 2. The device consists of two temperature sensors 242, one that measures the temperature of the radiator and one that measures the room temperature. It also includes an ultrasonic sensor 240 to measure the flow of the water. The device also includes a central processing unit 212, an LCD display 230, and a radio 220. For this analysis, a composite sensor active current of 2.2 uA and a composite off current of 1 uA is assumed. Sensor measurements occur every 30 seconds with each measurement taking 20 ms. The amount of data collected by the sensor is varied in the analysis to ascertain the impact of end node in-network storage by the system.

Subsystems Energy Consumption Model

A subsystem energy consumption model for WSN 100 will now be described in more detail.

Embedded Microcontroller Energy

The total energy consumption for MCU 210 includes the sum of the active, idle, and switching components. The active component is given by the equation (1).

$$E_{MCU\_active} = t_{active} \times I_{active} \times V \qquad (1)$$

where $t_{active}$ is the time the microcontroller is in an active state and $I_{active}$ is the drive current for the MCU during the active state. The operating voltage of the system is V where it is assumed that the system operates at a single voltage from battery 250.

The idle component of the MCU energy consumption is expressed by the equation (2).

$$E_{MCU\ idle} = t_{idle} \times I_{idle} \times V \qquad (2)$$

where $t_{idle}$ is the idle period between sensor measurements and data logging, RF communication and associated software tasks. In this case, the MCU is in a power down state with a timer enabled in order to carry out the timed sensor measurements, RF cycling, and transmissions. During each idle state, any data that is not stored in a non-volatile memory will be lost.

The switching component is obtained using a linear approximation of the energy consumption going from an idle state to an active state and going back to an idle state expressed by the equation (3).

$$E_{MCU\ switch} = [t_{MCU\ switch}(I_{active} - I_{idle})V]/2 \qquad (3)$$

where $t_{MCU\ switch}$ is the time it takes the system to go into either state. Multiplication by a factor of two is used to account for the system returning to the idle state.

RF Communication

The overall energy consumption during RF communication is the sum of the energy required during transmission, the energy required to receive data from the gateway or adjacent nodes, the switching energy going from idle and active states, the listening energy and the energy required to resolve anti-collisions during transmissions. The IEEE 802.5.4 standard [2] MAC and PHY layers call for a standard CSMA (carrier sense multiple access) procedure for resolving anti-collisions. The end nodes use a binary exponential backoff mechanism with an integer variable B defining the number of slots during each backoff period. The initial binary variable is initially set to three during which each end node with data to transmit selects a random time slot $R_1$ during the first $2^B - 1 = 7$ time slots. The end node then ascertains when the channel is available using a clear channel assessment (CCA) during this time slot. If the end node determines that the channel is busy during this time slot, it increases B by one to select $R_2$ and carries out the same CCA. The process is continued by increasing B to a value of five if it ascertains that the channel continues to be busy. Following this last increment, the end node will drop the packet if it fails to find an open slot. For this analysis, only the RF energy consumption associated with the MAC and PHY layer is accounted for. The additional overhead driven by the upper OSI layers of the RF protocol is not accounted for. In addition, beacon events called out in the MAC layer are not accounted for.

Listening Energy

Listening energy is defined as the energy consumed by the radio during the time it is active but not receiving information. During this period the radio is listening for data from either the gateway or adjacent end nodes that it then needs to respond to or retransmit depending on the message stream. The listening energy consumption is given by the equation (4).

$$E_l = [S/CK] \times T_{ch} \times I_{listen} \times V \qquad (4)$$

where S is the sampling period, CK is the check interval over which the radio is actively listening for incoming data and $I_{listen}$ is the current draw of the radio during this listening state.

Transmit Energy

The transmit energy is the energy required to transmit a packet of data with the associated control overhead on the radio. The overhead ensures the proper handshake between the transmitting and receiving entities. In this case, an overhead of 16 bytes is assumed. The transmission energy consumption is expressed by equation (5).

$$E_t = P_{sent} \times P_{length} \times T_B \times I_{tx} \times N \times V \qquad (5)$$

where $P_{sent}$ is the number of packets sent, $P_{length}$ is the length of a packet in bytes, $I_t$ is the current draw for the radio during transmission, $T_B$ is the time for transmitting one byte of data, and N refers to the Nth node. For a system consisting of a number of end nodes, each device will receive and retransmit data of a neighboring node regardless of the packet's destination. $T_B$ is the time it takes to transmit one byte of data given by 1/data rate.

Receive Energy

The end node's energy consumption during receipt of packet data from a neighboring node is given by the equation (6):

$$E_r = P_{rec} \times P_{length} \times T_B \times I_{rx} \times V \qquad (6)$$

where $I_r$ is the radio current draw during receipt of the packet data.

Radio Sleep Energy

During the time that the end node is in between transmit, receive, or listening states, the radio will go into a sleep state. The equation for the sleep energy consumption is expressed by equation (7).

$$E_{sleep} = T_{rf\ sleep} \times I_{sleep} \times V \qquad (7)$$

where $T_{rf\ sleep}$ is the time the radio remains in sleep mode.

Radio Switching Energy

Similar to the MCU switching energy, the radio switching energy is estimated using a linear approximation given by the equation (8).

$$E_{rf\ switch} = [T_{rf\ switch}(I_{active} - I_{sleep})V]/2 \qquad (8)$$

In the analysis, there is a need to account for the radio switching during the different modes. Switching which occurs during the listening mode is given by the equation (9).

$$E_{rf\ switch\ listen} = [S/CK] \times 2 \times E_{rf\ switch} \qquad (9)$$

The factor of two accounts for the switching back to the previous mode.

Sensing Energy

For various sensor node applications, the end node will typically have a number of sensors attached to the embedded system. In the case of the heat allocator example, the sensor node includes two temperature sensors and an ultrasonic flow sensor. The energy consumption of each sensor component is given by the equation 10.

$$E_{sensor\ on} = T_{sensor\ meas} \times I_{sensor\ on} \times V \quad (10)$$

where $T_{sensor\ meas}$ is the time required for the sensor to carry out the measurement and $I_{sensor\ on}$ is the current draw during the sensor measurement.

The energy consumption for the sensor during idle time is accounted by the equation (11).

$$E_{sensor\ idle} = T_{sensor\ off} \times I_{sensor\ idle} \times V \quad (11)$$

where $T_{sensor\ off}$ is the total period of time the sensor is sitting idle and $I_{sensor\ idle}$ is the sensor idle current. For an application consisting of multiple sensors, the total energy consumption is given by the sum of the individual sensors.

LCD Energy

For the heat allocator example, it is assumed that LCD 230 is shut down for 12 hours of the day during the evening hours. The LCD power consumption is expressed in the equation (12).

$$E_{LCD} = T_{LCD} \times I_{LCD} \times V \quad (12)$$

where $T_{LCD}$ is the period of time the LCD display is on and $I_{LCD}$ is the current consumed by the LCD. It is assumed that a reflective LCD display is used to limit the power consumption in the system.

Composite Energy Consumption

The composite energy consumption for the system is given by the sum of the energy consumption for each of the major components in the system for the given RF protocol used for communication. In the case of the IEEE 802.15.4 protocol, the energy consumption can be expressed by equation (13).

$$E_{composite} = E_{MCU\ total} + E_{sensor} + E_{listen} + E_t + E_r + E_{sleep} + E_{switch} + E_{LCD} \quad (13)$$

The lifetime of the end node is dependent on the total energy consumed by the system and the battery capacity. The end node lifetime is determined by equation (14).

$$L_{node\ lifetime} = [C_{batt} \times V] / E_{composite} \quad (14)$$

where $C_{batt}$ is the battery capacity used in the system. In this analysis, a Carbon-Zinc battery with an estimated battery capacity of 650 mAHr is assumed. In this analysis, a 30 percent discharge rate over the life of the battery is assumed.

Analysis

The parameters used in the analysis are listed in Table 1. The analysis begins by looking at the heat allocator example without data logging being considered in the consumption model. This allows the impact of the other major components in the system to be assessed. The impact of data logging is then performed to allow a comparison between Flash and FRAM-based devices. The parameters used in the analysis are for devices currently available in the market. MCU1 and MCU2 represent two different MCUs that may be used within the example sensor node. MCU2 includes additional processing circuitry and requires a higher operating current, as illustrated in Table 1.

TABLE 1

Simulation Parameters used in the system analysis.

| Parameter | Value |
| --- | --- |
| Itx | 18 mA |
| Irx | 17 mA |
| Ilisten | 1 mA |
| Isleep | 0.6 uA |
| TB | 33.3 usec |
| Trf switch | 2.3 msec |
| TCH | 1.8 msec |
| CK | 10 sec |
| V | 3.3 V |
| Iactive (MCU1) | 120 uA/Mhz |
| Iidle (MCU1) | 390 nA |
| Iactive (MCU2) | 235 uA/Mhz |
| Iidle (MCU2) | 900 nA |
| tMCU switch | 6 usec |

Energy Consumption Breakdown at Low RF Duty Cycles

In order to achieve a low RF duty cycle below 0.3 percent, the number of packets transferred during each RF transmission is limited. Correspondingly, the sensor data collected during each measurement cycle and buffer the data is limited. In this example, a buffer size of 120 bytes is assumed. Once the buffer reaches a value of 120 bytes, the information is transmitted over RF to the gateway. In this analysis, five different systems are considered, each having a sensor measurement cycle of 30 seconds. The first system collects twelve bytes of data during each sensor measurement cycle. After 300 seconds the buffer is full and the data is transmitted to the gateway. For each of the four remaining systems, the amount of data collected is constrained to eight bytes, four bytes, two bytes, and one byte during the 30 second sensor measurement cycle. The corresponding transmission times of each packet of information consisting of 120 bytes is 420 seconds, 900 seconds, 1800 seconds and 3600 seconds, respectively.

Figure 3:
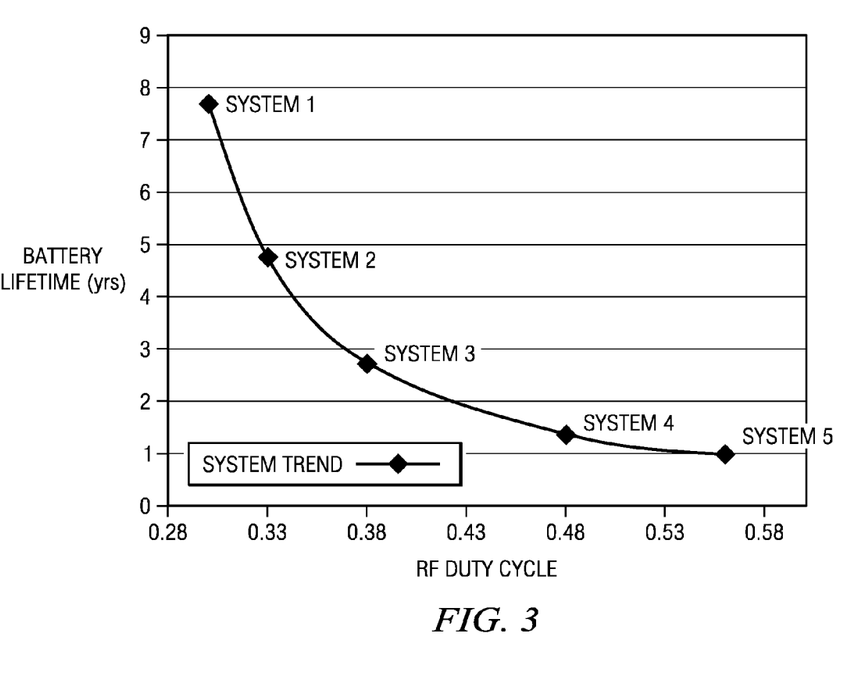
FIG. 3 is a plot illustrating battery life versus RF duty cycle.

FIG. 3 is a plot illustrating battery life versus RF duty cycle. The analysis for the MCU1 embedded controller is performed first. The expected battery life for each system as a function of the RF duty cycle is shown in FIG. 3 for the MCU1 embedded controller. The increase in the duty cycle is driven by the packet RF transmission as the listen cycle is kept to 10 seconds for each of the systems. Given that the listen cycle is held to 10 seconds, no difference in the latency between each of the five systems is expected. As expected, the calculated battery life decreases with the increased RF duty cycle.

Looking at the power consumption breakdown for the system running at the lowest RF duty cycle as shown in Table 2, it can be seen that 40 percent of the power consumption is driven by the other components outside of RF.

TABLE 2

Power consumption breakdown of the heat allocation sensor node for the lowest RF duty cycle.

| Power Efficiency Parameter | μA Hr (sample period of one day) |
| --- | --- |
| Radio Component | 111 |
| Sensor Component | 25 |
| MCU1 Component | 15 |
| LCD Driver | 12 |
| Total system consumption per day in μA Hr | 163 |
| Battery lifetime (455 mA Hr) in years | 7.65 |

Figure 4:
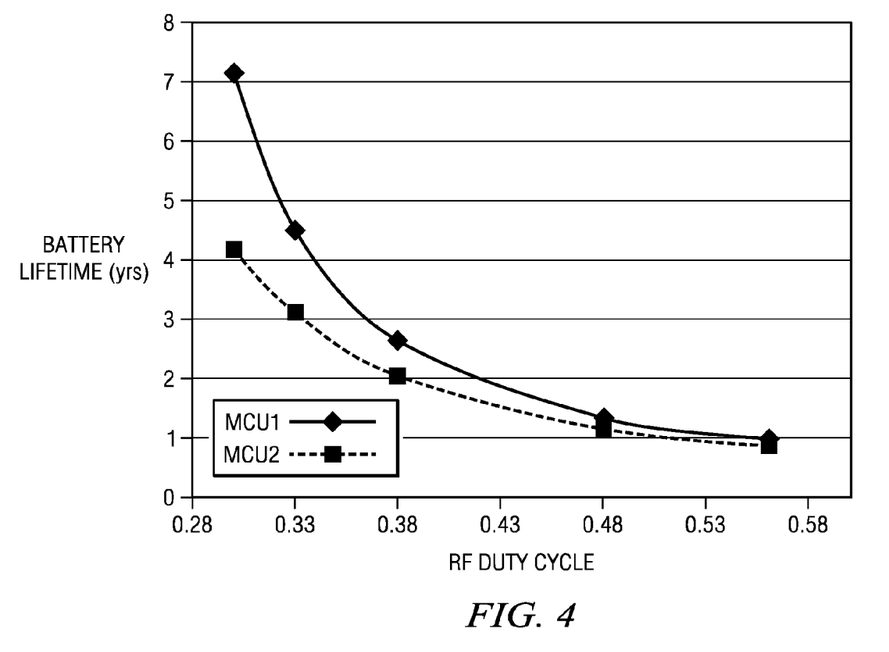
FIG. 4 is a plot illustrating comparison of battery life versus RF duty cycle for different MCU power consumption.

FIG. 4 is a plot illustrating comparison of battery life versus RF duty cycle for different MCU power consumption. Referring again to Table 1, the higher active current and off current for the MCU2 embedded controller resulted in an approximate three year reduction at the lowest RF duty cycle as compared to MCU1. At the higher RF duty, the transmission component dominates the power efficiency breakdown and both systems converge at an RF duty cycle of 0.48 percent.

FRAM vs. Flash

The case where the collected sensor data is stored in nonvolatile memory on either FRAM or Flash will now be considered. The collected sensor data needs to be stored in nonvolatile memory because between sampling points the MCU, including memory, is placed in a low power or power off condition in which data stored in volatile SRAM is lost. Note that Flash is limited to approximately 10,000 write cycles while FRAM write cycles are in the billions. This enables FRAM to be used in true data logging applications where data needs to be retrieved when system power restored after each period of power down between sampling and/or data processing activity. In addition, the lower energy costs associated with data logging on FRAM technology enable the use of in-sensor node storage to reduce the overall communication requirements. In this case, the power consumption of in-sensor node storage needs to be compared to the energy needs associated with the RF communications.

As shown earlier, communication costs are quite high at the higher RF duty cycles and drive the lifetime of the system. By taking advantage of the lower energy costs associated with in-network storage and related low computational power costs of FRAM, the communications energy requirements can be significantly reduced. The overall reduction in communications energy costs can be achieved by enabling the sensor to carry out adaptive changes to its data collection based on the historical data collected over time. The sensor may chose to disregard data if it does not detect any significant changes based on the trends observed over a predefined sampling period. The system can build predictive time series models taking advantage of the low computational energy requirements associated with the algorithm [3]. These time-series models require a significant amount of historical data to build the required accuracy and can only be achieved with a low energy consumption memory technology such as FRAM to take advantage of the local storage. The reduction in energy costs comes from a reduction of the amount of data that is transferred over RF.

The lower energy costs associated with FRAM also allow for aggregation of the sensor-collected data that rely on hash tables to perform duplicate packet suppression [4]. These hash tables are typically too large to be carried out in SRAM 215. FRAM-based data management schemes can be used to store these hash tables with low energy costs, thereby improving the performance of the system.

In this section, the energy costs associated with data logging of the sensor data which can be subsequently used to build the time-series models or aggregated to reduce the number of packets transmitted over RF are considered. The parameters used in this analysis are shown in Table 3. The heat allocator example is used to illustrate the benefits in a wireless sensor solution. A comparison is carried out with Flash as a storage mechanism as well. In the case of Flash, block erase requirements associated with writing to this memory technology are accounted for.

TABLE 3

Memory programming data logging parameters.

| Parameter | Value |
|---|---|
| Tprogram FRAM | 100e−9 sec |
| Iprogram FRAM | .85 mA |
| Tprogram Flash | 100e−6 sec |
| Iprogram Flash | 2 mA |
| Terase | 20e−3 sec |
| Ierase | 32 mA |

Similar to the previous example, five different systems are considered with the only difference being the amount of data collected by the sensor. Each system is expected to transmit the aggregated data once per hour with the aggregation extended to only 120 bytes of data during the one hour sequence. Each system transmits one packet of data consisting of these 120 bytes of aggregated data. The associated energy costs associated with data logging of the sensor data are accounted for in the analysis prior to aggregation. The first system collects four bytes of data every 30 sec while the remaining four systems collect eight bytes, twelve bytes, 24 bytes, and 32 bytes respectively during the 30 sec sensor measurement cycle. The subsystems energy consumption model is used to estimate the expected battery lifetime for the heat allocator example.

Figure 5:
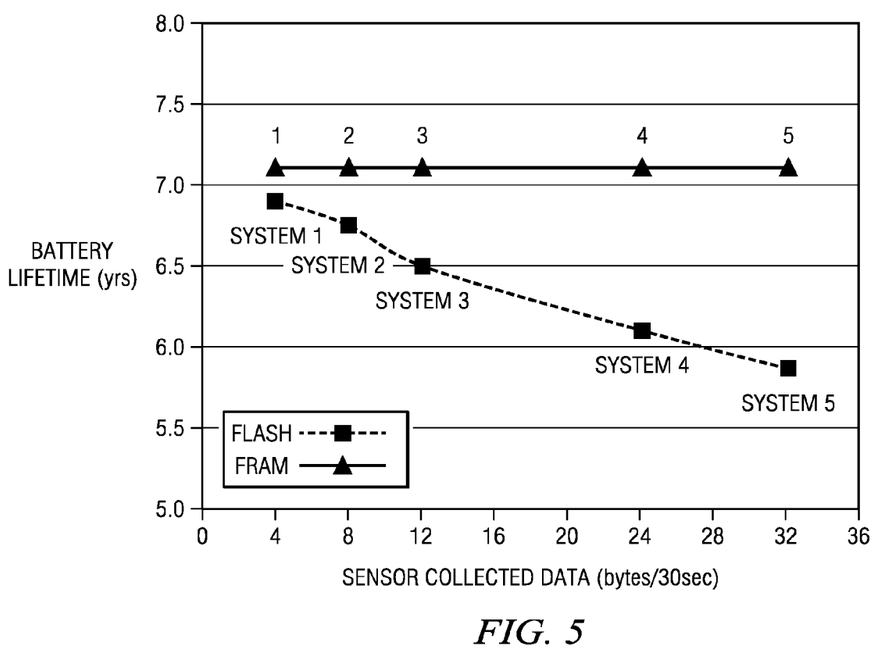
FIG. 5 is a plot illustrating FRAM vs. Flash system battery times for aggregated data logging system.

FIG. 5 is a plot illustrating FRAM vs. Flash system battery times for aggregated data logging system for each of the five systems. The RF duty cycle of the systems remains constant for each of the five systems as the RF transmission cycle occurs every hour and the listen cycle is held to 10 seconds for each of the systems. It can be seen that data logging to FRAM does not reduce the overall battery lifetime of the system, even for the system that collects 32 bytes of sensor data every 30 seconds. The associated energy consumption for storing the data in FRAM is a small component of the total energy efficiency breakdown for the system at this low RF duty cycle. In comparison, it can be seen that data logging to Flash results in an approximate 20 percent reduction in the estimated battery lifetime compared to FRAM. However, given that Flash is typically rated at only 10,000 write cycles, Flash is not suitable for data logging since writing at a rate of only once per hour would exhaust the Flash in a little over a year.

In order to draw a further comparison of expected system lifetimes using an aggregation model versus an RF scheme where the data is transmitted without aggregation, battery capacity is calculated for a system where the sensor is collecting four bytes of data every 30 seconds. In this case, the system is asked to transmit 480 bytes of data every hour. The projected battery life for this scheme equates to a system lifetime of 2.7 years. In comparison, the estimated lifetime for the system running the aggregation model is 7.1 years. The lower system lifetime is driven by the higher energy costs associated with the transmission of a larger number of bytes, increasing the overall RF duty cycle of the system.

The low energy consumption requirements for FRAM make this memory technology ideal for data logging in energy scavenging applications. An energy scavenging solution can drive the sensor data logging component while the battery can be called upon during the RF transmission. The lower energy requirements for FRAM technology enable smaller and less complex energy harvesting systems where harvested power can range from a ~4 $uW/cm^2$ for a vibration solution and 100 $uW/cm^2$ for an outdoor lighting scavenging application.

Figure 6:
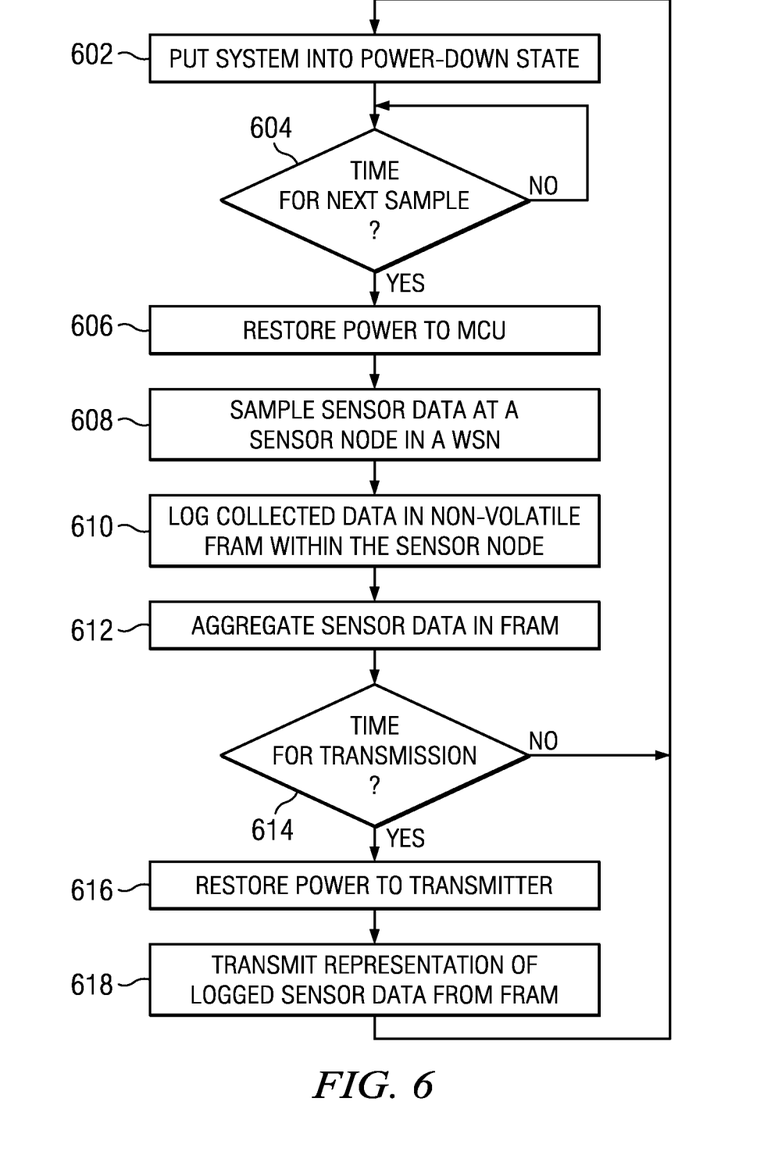
FIG. 6 is a flow diagram illustrating logging of data within the WSN of FIG. 1.

FIG. 6 is a flow diagram illustrating logging of data within a sensor node 200 in WSN 100. A large percentage of time, the sensor node 200 is in a power-down, or idle, state 602. While in an idle state, data stored within volatile memory 215 is lost, but data stored within non-volatile FRAM 214 is preserved due to the nature of the FRAM technology.

Timer 216 within MCU 210 remains active during the idle state. After a selected amount of time 604, power is restored 606 to MCU 210. An application program stored in FRAM 214 is executed by CPU 212 which causes a data sample to be taken 608 from each of sensors 240, 242. The collected data is logged 610 into non-volatile FRAM 214 and is therefore preserved during times when the sensor node is in an idle state 602.

Data aggregation 612 may also be performed on the logged data in FRAM 214, as described in more detail above. The lower energy costs associated with FRAM also allow for aggregation of the sensor-collected data that rely on hash tables to perform duplicate packet suppression. These hash tables are typically too large to be carried out in SRAM 215. FRAM-based data management schemes can be used to store these hash tables with low energy costs, thereby improving the performance of the system.

A second timer keeps track of the RF transmission rate. When it is time 614 to transmit sensor data, power is restored 616 to transmitter 220 and a representation of the logged data produced by aggregation 612 is transmitted to a next higher level in the WSN hierarchy. In order to minimize energy consumption, the period of time 614 between transmissions is significantly longer than the period of time 604 between samples, as described in more detail above.

In some embodiments, aggregation may be omitted, depending on the type of data and the sampling rate, for example.

Other Embodiments

While the invention has been described with reference to illustrative embodiments, this description is not intended to be construed in a limiting sense. Various other embodiments of the invention will be apparent to persons skilled in the art upon reference to this description. For example, while a temperature sensing network was described herein, many other types of environmental data may be sensed, logged, aggregated, and transmitted in a power efficient manner using FRAM to store the logged data while the sensing node is placed in a low power idle state.

A sensing node may be implemented on a single integrated circuit as a system on a chip (SoC), or may be implemented in two or more integrated circuits that are coupled together by means of a substrate or by other coupling mechanisms, such as stacked packaging, etc.

A sensing node may include a user readable display. In another embodiment, no display is provided. A sensing node may include a user input mechanism, such as buttons, keypad, etc. In another embodiment, no user input mechanism is provided.

A wireless sensing node may be powered solely by a battery, or may include energy scavenging devices to augment or supplant the battery.

The aggregation techniques described in this disclosure may be implemented in hardware, software, firmware, or any combination thereof. If implemented in software, the software may be executed in one or more processors, such as a microcontroller, microprocessor, application specific integrated circuit (ASIC), field programmable gate array (FPGA), digital signal processor (DSP), etc. The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the preceding discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

REFERENCES

[1] S. Bhadra, S. Choi, Y. Sun, X. Lu: Achieving a 10× Lifetime Increase with IEEE 802.15.4e Motes. In SenSys'11, Nov. 1-4, 2011, Seattle, Wash., USA

[2] IEEE 802.15.4 MAC/Phy Standard for Low-Rate Wireless Personal Area Networks (LR-WPAN's), IEEE, http://www.ieee802.or/15/pub/TG4.html, 2010

[3] P. Desnoyers, D. Ganesan, H. Li, and P. Shenoy. PRESTO: A predictive storage architecture for sensor networks. In Tenth Workshop on Hot Topics in Operating Systems (HotOS X)., June 2005

[4] J. Heidemann, F. Silva, C. Intanagonwiwat, R. Govindan, D. Estrin, and D. Ganesan. Building efficient wireless sensor networks with low-level naming. In Proceedings of the Symposium on Operating Systems Principles, pages 146-159, Banff, Alberta, Canada, October 2001. ACM.

What is claimed is:

1. A method for operating a wireless sensor module, the method comprising:
   collecting sensor data in a periodic manner with a first time period;
   logging the sensor data in a non-volatile ferroelectric random access memory (FRAM) within the sensor module;
   placing the sensor module in a reduced power idle mode between sensor data collection periods, wherein the logged sensor data is preserved by the FRAM during the idle mode; and transmitting a representation of the logged sensor data over a radio channel to a remote receiver in a periodic manner with a second time period, wherein the second time period is longer than the first time period;

aggregating the logged sensor data during the second time period to form the representation of the logged sensor data, wherein aggregating comprises processing the logged sensor data in the FRAM by using the FRAM as a scratchpad memory during the processing;

wherein aggregating the logged sensor data further comprises using a hash table stored in the FRAM to perform duplicate packet suppression.

2. The method of claim 1, wherein the first period is less than approximately one minute and the second period is at least ten times the first period.

3. The method of claim 1, further comprising allocating a portion the FRAM to hold software instructions for execution by a central processing unit (CPU) within the sensor module, and allocating another portion of the FRAM to be used as working memory for the CPU.

4. A wireless sensor module comprising:

a central processing unit (CPU) coupled to a ferroelectric random access memory (FRAM), wherein a portion the FRAM holds software instructions for execution by the CPU and another portion of the FRAM is allocated for use as working memory for the CPU;

a sensor coupled to the CPU, wherein the CPU is operable to collect sensor data and log the collected sensor data in the FRAM in a periodic manner with a first time period;

a transmitter coupled to the CPU, wherein the CPU is operable to initiate transmission of a representation of the logged sensor data over a radio channel to a remote receiver in a periodic manner with a second time period, wherein the second time period is longer than the first time period; and a power management module coupled to the CPU, FRAM, and transmitter, wherein the power management module is configured to place the sensor module in a reduced power idle mode between sensor data collection periods, wherein the logged sensor data is preserved by the FRAM during the idle mode;

wherein the CPU is operable to execute instructions from the FRAM to aggregate the logged sensor data during the second time period to form the representation of the logged sensor data, wherein aggregating comprises processing the logged sensor data in the FRAM by using the FRAM as a scratchpad memory during the processing; and wherein aggregating the logged sensor data further comprises using a hash table stored in the FRAM to perform duplicate packet suppression.

5. The wireless sensor of claim 4, wherein the first period is less than approximately one minute and the second period is at least ten times the first period.

6. A wireless sensor network comprising:

a plurality of wireless sensor modules wirelessly coupled to one or more coupled control modules;

a control channel for controllably coupling to a resource system to provide control information to the resource system; and wherein each one of at least a portion of the plurality of wireless sensors comprises:

a central processing unit (CPU) coupled to a ferroelectric random access memory (FRAM), wherein a portion the FRAM holds software instructions for execution by the CPU and another portion of the FRAM is allocated for use as working memory for the CPU;

a sensor coupled to the CPU, wherein the CPU is operable to collect sensor data and log the collected sensor data in the FRAM in a periodic manner with a first time period;

a transmitter coupled to the CPU, wherein the CPU is operable to initiate transmission of a representation of the logged sensor data over a radio channel to a remote receiver in a periodic manner with a second time period, wherein the second time period is longer than the first time period; and a power management module coupled to the CPU, FRAM, and transmitter, wherein the power management module is configured to place the sensor module in a reduced power idle mode between sensor data collection periods, wherein the logged sensor data is preserved by the FRAM during the idle mode;

wherein the CPU is operable to execute instructions from the FRAM to aggregate the logged sensor data during the second time period to form the representation of the logged sensor data, wherein aggregating comprises processing the logged sensor data in the FRAM by using the FRAM as a scratchpad memory during the processing; and wherein aggregating the logged sensor data further comprises using a hash table stored in the FRAM to perform duplicate packet suppression.

7. The wireless sensor network of claim 6, wherein the first period is less than approximately one minute and the second period is at least ten times the first period.

\* \* \* \* \*